United States Patent

Zadeh et al.

[11] Patent Number: 6,047,182
[45] Date of Patent: Apr. 4, 2000

[54] CHANNEL RESOURCE UTILIZATION DURING A POSITIONING HANDOVER

[75] Inventors: Bagher R. Zadeh; Gunnar Borg, both of Dallas, Tex.

[73] Assignee: Ericsson Inc., Research Triangle Park, N.C.

[21] Appl. No.: 08/960,630

[22] Filed: Oct. 29, 1997

[51] Int. Cl.[7] .................................................. H04Q 7/20
[52] U.S. Cl. .......................................... 455/440; 455/456
[58] Field of Search .................................... 455/422, 436, 455/437, 438, 440, 450, 456, 464, 525, 553; 342/457

[56] References Cited

U.S. PATENT DOCUMENTS

| | | | |
|---|---|---|---|
| 5,327,575 | 7/1994 | Menich et al. | 455/437 |
| 5,432,843 | 7/1995 | Bonta | 455/437 |
| 5,564,079 | 10/1996 | Olsson | 455/456 |
| 5,722,072 | 2/1998 | Crichton et al. | 455/437 |
| 5,732,354 | 3/1998 | MacDonald | 455/456 |
| 5,740,166 | 4/1998 | Ekermark et al. | 455/440 |
| 5,839,071 | 10/1996 | Johnson | 455/440 |

FOREIGN PATENT DOCUMENTS

| | | |
|---|---|---|
| 0 800 319 A1 | 10/1997 | European Pat. Off. . |
| WO 97/27711 | 7/1997 | WIPO . |

OTHER PUBLICATIONS

PCT International Search Report dated Mar. 4, 1999.

*Primary Examiner*—Dwayne D. Bost
*Assistant Examiner*—Jean A. Gelin
*Attorney, Agent, or Firm*—Jenkens & Gilchrist, P.C.

[57] ABSTRACT

A telecommunications system and method for efficiently managing physical channels during a positioning handover to a target Base Transceiver Station. This can be accomplished by allowing a positioning handover to occur from one channel type, e.g., a traffic channel of the serving BTS, to another channel type, e.g., a control channel of the target BTS. Advantageously, in case of congestion on one type of channel in the target cell, the other type can be used, which allows the positioning handover to the desired target BTS to be performed and the data needed to be collected.

24 Claims, 4 Drawing Sheets though it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

CHANNEL RESOURCE UTILIZATION DURING A POSITIONING HANDOVER

BACKGROUND OF THE PRESENT INVENTION

1. Field of the Invention

The present invention relates generally to telecommunications systems and methods for determining the geographical location of a mobile terminal within a cellular network, and specifically to efficiently managing physical channels during a positioning handover to a target Base Transceiver Station.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

Determining the geographical position of a MS within a cellular network has recently become important for a wide range of applications. For example, positioning services may be used by transport and taxi companies to determine the location of their vehicles. In addition, for emergency calls, e.g., 911 calls, the exact location of the mobile terminal may be extremely important to the outcome of the emergency situation. Furthermore, positioning services can be used to determine the location of a stolen car, for the detection of home zone calls, which are charged at a lower rate, for the detection of hot spots for micro cells, or for the subscriber to determine, for example, the nearest gas station, restaurant, or hospital.

Currently, as can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Positioning Center (PC) 270 for calculation of the geographical location of the MS 200. The location of the MS 200 can then be sent to the application 280 within the network that requested the positioning.

In order to accurately determine the location of the MS 200, positioning data from three separate Base Transceiver Stations (210, 220, and 230) is required. This positioning data for GSM systems includes a Timing Advance (TA) value, which corresponds to the amount of time in advance that the MS 200 must send a message in order for the BTS 220 to receive it in the time slot allocated to that MS 200. It should be understood, however, that any estimate of distance can be used, instead of the TA value of GSM systems. When a message is sent from the MS 200 to the BTS 220, there is a propagation delay, which depends on the distance between the MS 200 and the BTS 220. TA values are expressed in bit periods, and can range from 0 to 63, with each bit period corresponding to approximately 550 meters between the MS 200 and the BTS 220.

Once a TA value is determined for one BTS 220, the distance between the MS 200 and that particular BTS 220 is known, but the actual location is not. If, for example, the TA value equals one, the MS 200 could be anywhere along a radius of 550 meters. Two TA values from two BTSs, for example, BTSs 210 and 220, provide two possible points that the MS 200 could be located (where the two radiuses intersect). However, with three TA values from three BTSs, e.g., BTSs 210, 220, and 230, the location of the MS 200 can be determined with a certain degree of accuracy. Using a triangulation algorithm, with knowledge of the three TA values and site location data associated with each BTS (210, 220, and 230), the position of the mobile station 200 can be determined (with certain accuracy) by the Positioning Center 270.

Therefore, Timing Advance (TA) values are obtained from the original (serving) BTS 220 and two neighboring (target) BTSs (210 and 230). In order for each target BTS (210 and 230) to determine a TA value, a positioning handover to each of the BTSs (210 and 230) must occur. A positioning handover is identical to an ordinary asynchronous handover. The target BTS, e.g., BTS 210, distinguishes the Positioning Handover from an ordinary handover by a new ACTIVATION TYPE in the CHANNEL ACTIVATION message. Unlike an ordinary handover, upon reception of a HANDOVER ACCESS message from the MS 200, the target BTS 210 only calculates the TA value, and does not respond to the mobile station 200, that is, no PHYSICAL INFORMATION is sent to the MS 200. Thus, the MS 200 will then return to the previous channel allocated by the original BTS 220 after the time period defined by the MS's 200 internal counter expires, e.g., 320 milliseconds.

The digital GSM system uses Time Division Multiple Access (TDMA) to handle radio traffic in each cell. TDMA divides each frequency (carrier) into eight time slots (physical channels). Logical channels are then mapped onto these physical channels. Examples of logical channels include traffic (speech) channels (TCH) and Control Channels (CCH). In a GSM cellular network, a traffic channel occupies one physical channel, whereas eight dedicated control channels occupy one physical channel.

During a positioning handover, an asynchronous handover is performed normally from one traffic channel to another traffic channel, or from one control channel to another control channel. To collect the necessary data, the channel in the target BTS 230 is utilized for approximately 320 milliseconds. This means that the traffic capacity in the target cell is somewhat affected. Furthermore, if there is no idle channel of the desired type in the target BTS 230, the positioning handover will not occur. Hence, no positioning data can be gathered from that target BTS 230. Therefore, by performing positioning handovers from one channel type to the same channel type, e.g., from one traffic channel to another traffic channel, the channel resources are not utilized efficiently.

It is therefore an object of the invention to allow a positioning handover to occur from one type of channel to another type of channel, e.g., from a traffic channel of the serving BTS to a control channel of the target BTS, in order to efficiently utilize the physical channels of the target BTS.

SUMMARY OF THE INVENTION

The present invention is directed to telecommunications systems and methods for efficiently managing physical channels during a positioning handover to a target Base Transceiver Station. This can be accomplished by allowing a positioning handover to occur from one channel type, e.g., a traffic channel of the serving BTS, to another channel type, e.g., a control channel of the target BTS. Advantageously, in case of congestion on one type of channel in the target cell, the other type can be used, which allows the positioning handover to the desired target BTS to be performed and the data needed to be collected. A Stand-alone Dedicated Control Channel (SDCCH) is one-eighth of a physical channel, whereas a Traffic Channel (TCH) occupies an entire physical channel. Therefore, by utilizing SDCCH for positioning handovers, the physical channels in the target BTS can be utilized efficiently.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
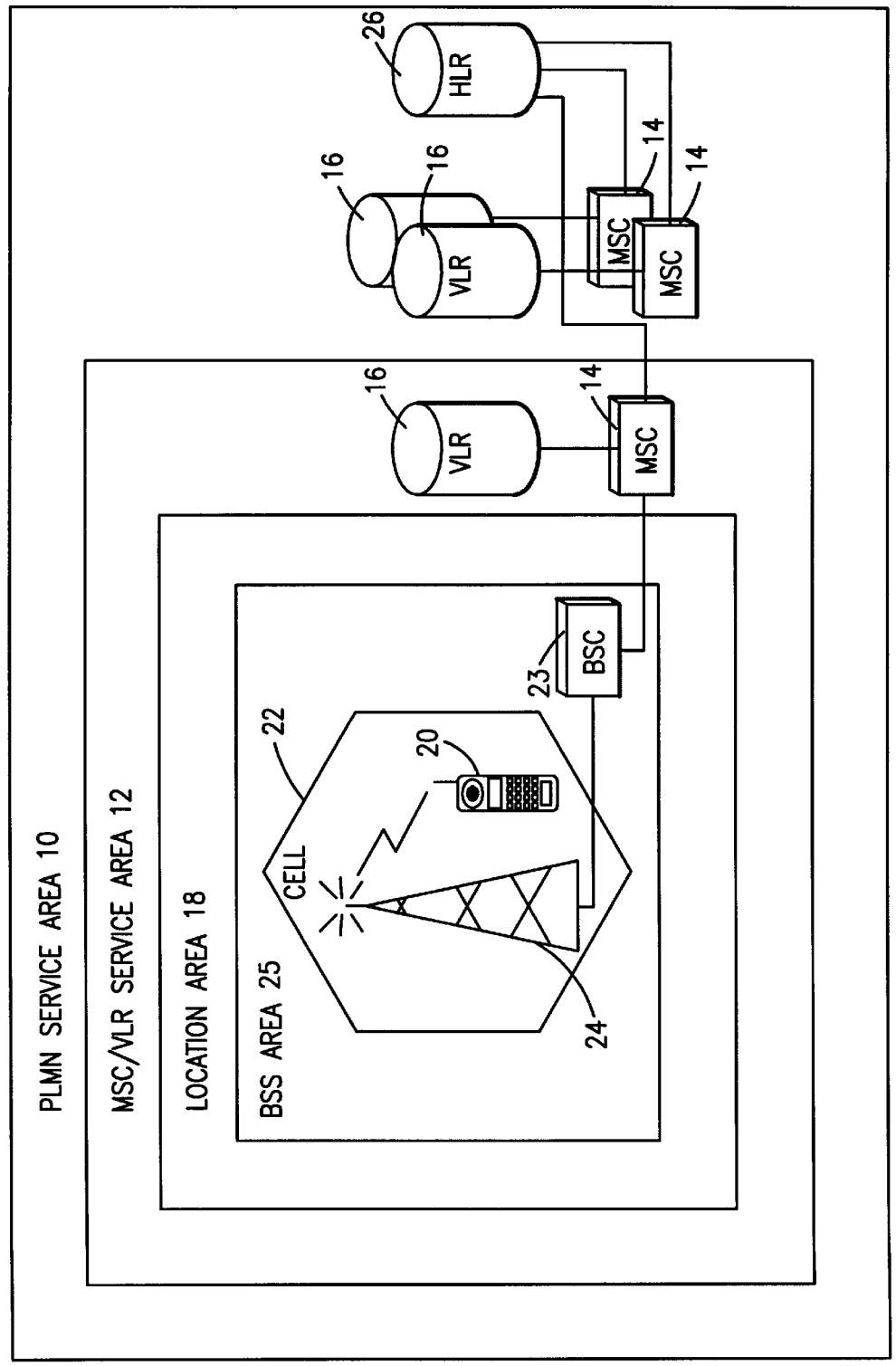
FIG. 1 is a block diagram of a conventional terrestrially-based wireless telecommunications system.
Figure 2:
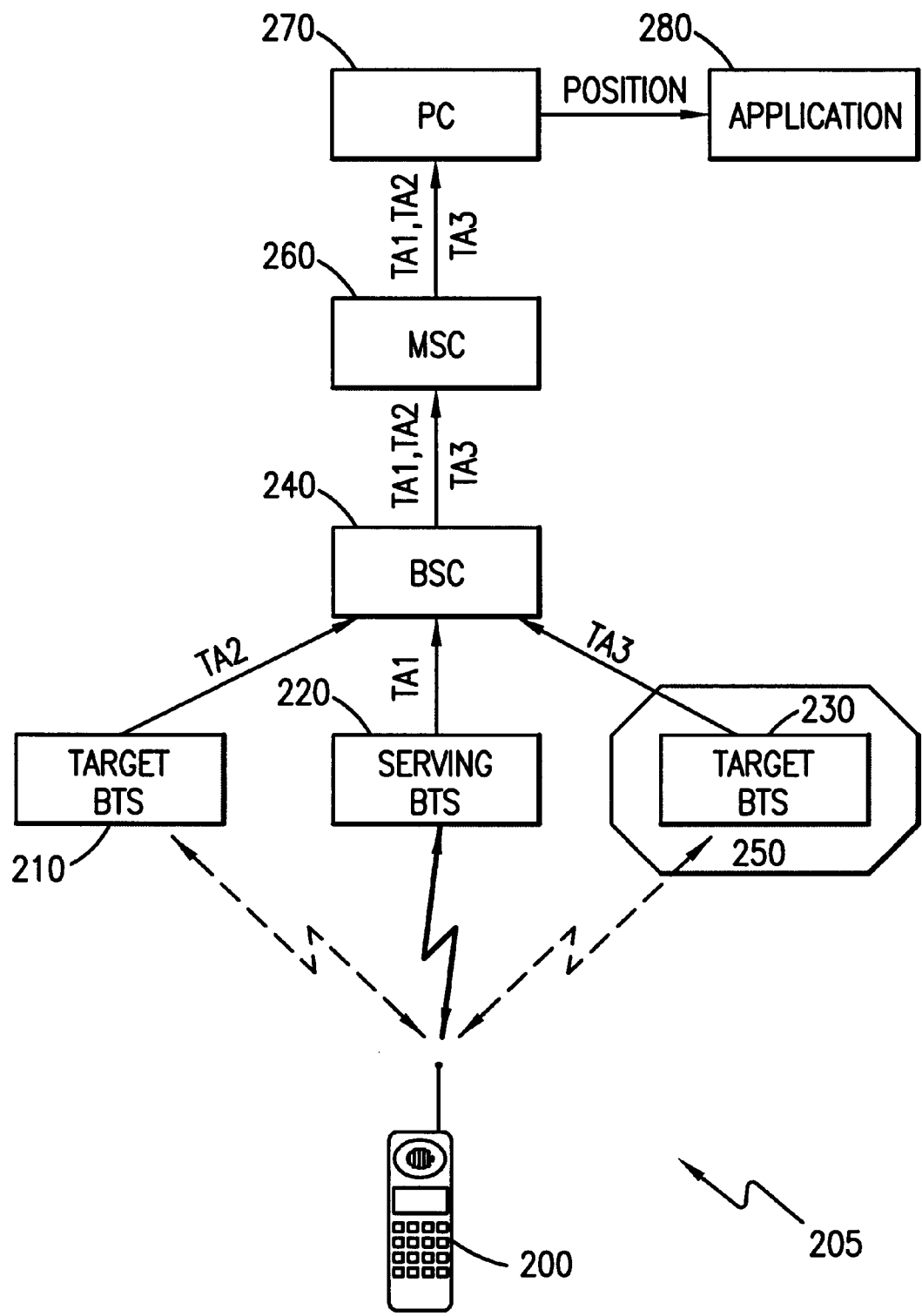
FIG. 2 illustrates a sample positioning handover in which positioning data is acquired by a target base transceiver station and transmitted to a serving base station controller.

After a positioning handover, as illustrated in FIG. 2 of the drawings, a Mobile Station (MS) 200 returns to the previous channel of a serving BTS 220 (according to the normal process) after a time period defined by the MSs 200 internal counter. According to GSM specifications, this time period for a traffic channel (TCH) is 320 milliseconds and for a Stand-alone Dedicated Control Channel (SDCCH) is 675 milliseconds. Therefore, using TCHs during a positioning handover allows for a shorter speech interruption. However, using SDCCHs during a positioning handover provides for a more efficient utilization of channel resources due to the fact that one control channel is only one-eighth of a physical channel, while a traffic channel occupies an entire physical channel.

In addition, the preferred channel type differs depending upon the state of the MS 200, e.g., when the mobile station 200 being positioned is in an idle mode (not in use), the preferred channel type is a SDCCH, and when the mobile station 200 is in a dedicated mode (in use), a TCH is preferred. However, in case of congestion in the target cell 250, the preferred channel type does not need to be used. Instead, a different channel type can be allocated to perform the positioning handover in order to maximize both the duration of channel occupation, and the efficient utilization of channel resources.

Figure 3A:
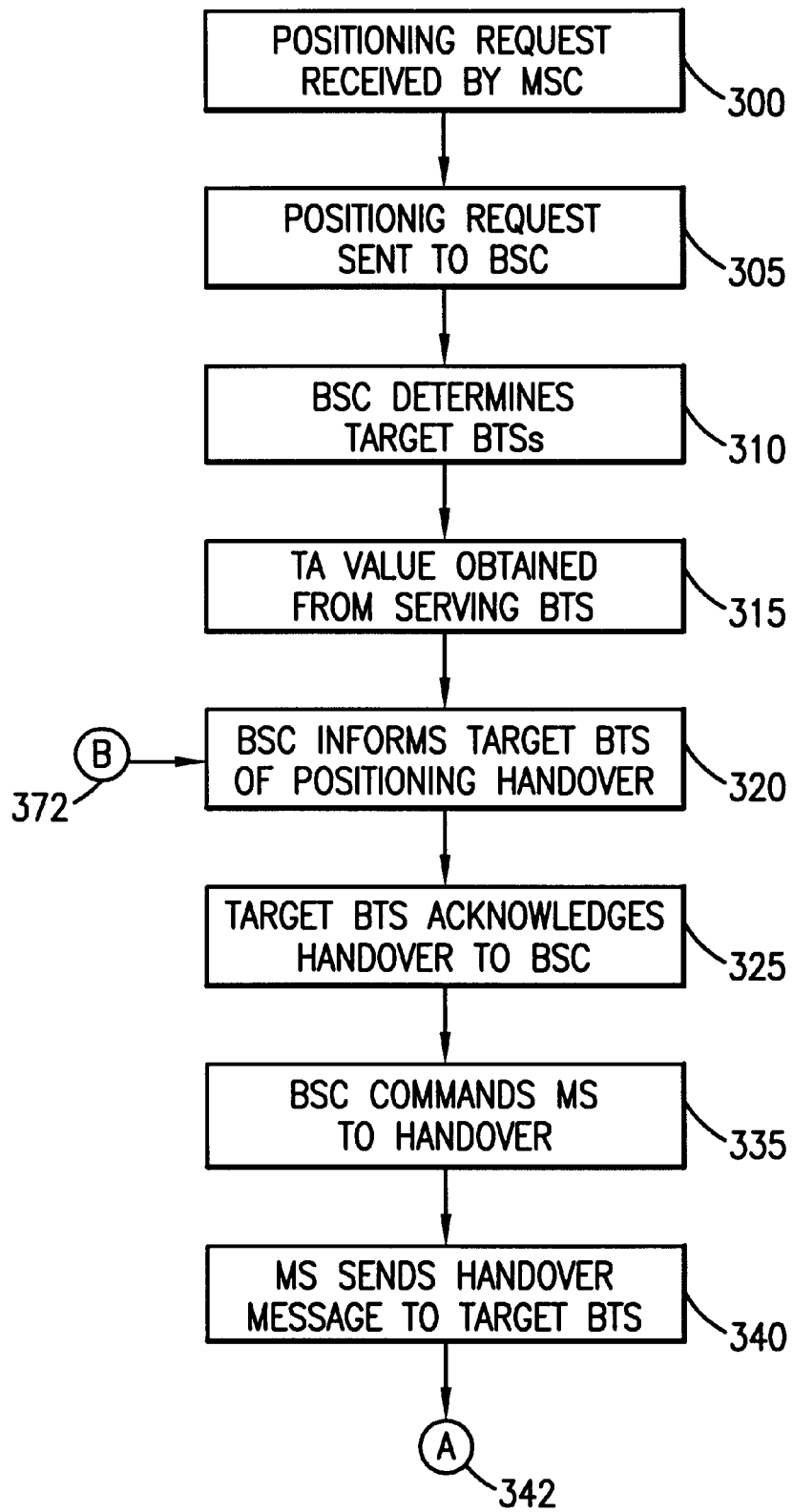
FIGS. 3A and 3B are flow charts demonstrating steps in a sample channel allocation process during a positioning handover to a target base transceiver station.
Figure 3B:
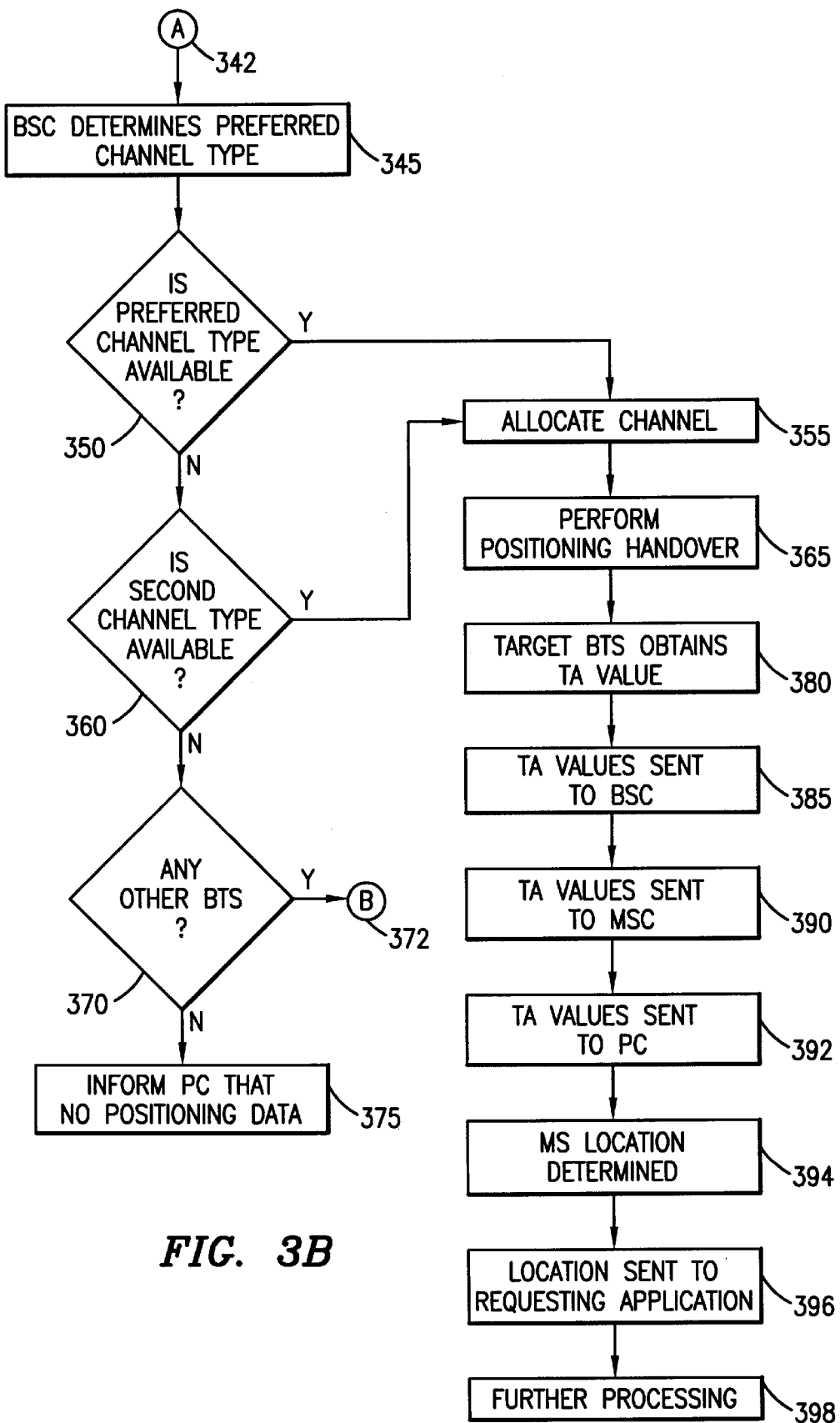

With reference now to FIGS. 3A and 3B of the drawings, steps in a sample channel allocation process during a positioning handover are illustrated. Initially, after a positioning request is received by the Mobile Switching Center 260 (step 300) serving the Location Area 205 that the MS 200 is in from a Positioning Center 270, which could be located within the MSC 260, or could be a separate node in communication with the MSC 260, the MSC 260 sends this positioning request to the originating (serving) Base Station Controller (BSC) 240 (step 305).

The originating BSC 240 then determines which Base Transceiver Stations (BTSs) (210, 220, and 230) can be used for acquiring a Timing Advance (TA) value (step 310) to accurately determine the location of the MS 200. First, a TA value is obtained from the serving BTS 220 (TA1) (step 315), and then TA values are obtained from the other target BTSs (210 and 230) by performing a positioning handover. The positioning handover is accomplished by the serving BSC 240 sending a new ACTIVATION TYPE in a CHANNEL ACTIVATION message to the target BTS 230, which informs the target BTS 230 that a positioning handover needs to be performed (step 320). The target BTS 230 then acknowledges the CHANNEL ACTIVATION message to the serving BSC 250 (step 325).

Thereafter, the BSC 240 sends a command to the MS 200 via the serving BTS 220 (step 335) to transmit a HANDOVER ACCESS message to the target BTS 230 (step 340). Subsequently, as shown in FIG. 3B of the drawings (step 342), the preferred channel type (TCH or SDCCH) is determined by the BSC 240 (step 345). As stated hereinbefore, the preferred channel type depends upon the positioning case. For example, if the MS 200 is in an idle mode, a control channel would be preferred, whereas if the MS 200 is in a dedicated mode, the preferred channel type would be a traffic channel.

Subsequently, the BSC 240 determines if the preferred channel type is available to the target BTS 230 (step 350). If so, the target BTS 230 allocates that channel type (step 355) and conducts the positioning handover (step 365). However, if the channel type is not available, the BSC 240 then determines if another channel type is available (step 360). If the second channel type is available, the target BTS 230 allocates that channel (step 355) and conducts the positioning handover (step 365).

However, in the event that no channel types are available, the BSC 240 must then determine if there are any other BTSs (not shown) in the area that can perform a positioning handover (step 370). If another BTS (not shown) exists (step 372), then the BSC 240 informs this BTS (not shown) that a positioning handover will take place (step 320). Subsequently, the preferred channel type for this target BTS (not shown) is determined (step 345), and a determination is made regarding what channel types, if any, are available to the additional target BTS (not shown) (steps 350–365). If no other BTS can perform the positioning handover, the BSC 240 must then inform the Positioning Center 270 via the MSC 260 that the positioning data could not be obtained (step 375).

If a channel type is available in the target cell 250, during the time that the MS 200 is waiting for a response from the target BTS 230, e.g., around 320 milliseconds for a TCH, the target BTS 230 measures the Timing Advance value (access delay) (TA3) (step 380), using access bursts sent by the MS 200, and forwards this positioning data to the serving BSC 240 (step 385). The TA value measured by the target BTS 230 (TA3) is then transmitted by the serving BSC 250 to the MSC 260 (step 390).

Finally, the TA value acquired from the target BTS 230 (TA3), together with other TA values (TA1 and TA2) are forwarded to the Positioning Center (PC) 270 from the MSC 260 (step 392), where the location of the MS 200 is determined using the triangulation algorithm (step 394). The PC 270 then presents the geographical position of the MS 200 to the requesting application (node) 280 (step 396) for further processing (step 398).

As will be recognized by those skilled in the art, the innovative concepts described in the present application can be modified and varied over a wide range of applications. Accordingly, the scope of patented subject matter should not be limited to any of the specific exemplary teachings discussed.

For example, it should be noted that the aforedescribed handling of positioning data can be implemented in any cellular system, and should not be limited to GSM systems. In other cellular systems, the Base Station Controller function can be implemented within the Mobile Switching Center itself.

What is claimed is:

1. A telecommunications system for managing allocation of channels during a positioning handover of a mobile station in wireless communication with a mobile switching center, said telecommunications system comprising:

a serving base transceiver station in communication with said mobile switching center and in wireless communication with said mobile station over a channel of a first channel type; and a first target base transceiver station in communication with said mobile switching center for performing said positioning handover of said mobile station, said first target base transceiver station being configured to allocate a channel of said first channel type when said first channel type is available for said positioning handover, said first target base transceiver station being configured to allocate a channel of a second channel type when said first channel type is unavailable for said positioning handover.

2. The telecommunications system of claim 1, wherein said first channel type is a traffic channel.

3. The telecommunications system of claim 1, wherein said second channel type is a Stand-alone Dedicated Control Channel.

4. The telecommunications system of claim 1, wherein said first channel type is a control channel and said second channel type is a traffic channel.

5. The telecommunications system of claim 1, wherein said first channel type is a control channel when said mobile station is in an idle mode, said first channel type being a traffic channel when said mobile station is in a dedicated mode.

6. The telecommunications system of claim 1, further comprising a positioning center connected to said mobile switching center, said positioning center sending a positioning request of said mobile station to said mobile switching center, said mobile switching center forwarding said positioning request to a base station controller connected to said serving base transceiver station, said serving base transceiver station determining first positioning data associated with said mobile station and sending said first positioning data to said positioning center via said mobile switching center and said base station controller.

7. The telecommunications system of claim 6, wherein said first positioning data is a Timing Advance value.

8. The telecommunications system of claim 6, further comprising a second target base transceiver station, said second target base transceiver station determining second positioning data associated with said mobile station during said positioning handover, said first target base transceiver station sending said third positioning data to said positioning center via said mobile switching center and said base station controller.

9. The telecommunications system of claim 8, wherein said base station controller determines said first target base transceiver station and said second target base transceiver station, said first target base transceiver station determining third positioning data associated with said mobile station during said positioning handover, said first target base transceiver station sending said third positioning data to said positioning center via said mobile switching center and said base station controller.

10. The telecommunications system of claim 9, wherein said positioning center calculates the location of said mobile station, using said first, second, and third positioning data.

11. The telecommunications system of claim 10, wherein said positioning center sends the location of said mobile station to a positioning requesting node.

12. A method for managing allocation of channels during a positioning handover of a mobile station from a serving base transceiver station, said mobile station being in wireless communication with a mobile switching center via said serving base transceiver station, said method comprising the steps of:

determining a first channel type associated with a channel allocated to said mobile station by said serving base transceiver station;

allocating, by said first target base transceiver station, a channel of said first channel type to perform said positioning handover when said first channel type is available; and allocating, by said first target base transceiver station, a channel of a second channel type to perform said positioning handover when said first channel type is unavailable.

13. The method of claim 12, wherein said first channel type is a traffic channel.

14. The method of claim 12, wherein said second channel type is a Stand-alone Dedicated Control Channel.

15. The method of claim 12, wherein said first channel type is a control channel and said second channel type is a traffic channel.

16. The method of claim 12, wherein said first channel type is a control channel when said mobile station is in an idle mode, said first channel type being a traffic channel when said mobile station is in a dedicated mode.

17. The method of claim 12, further comprising, before said step of determining said first channel type, the steps of:

sending a positioning request, by a positioning center connected to said mobile switching center, to said mobile switching center;

forwarding, by said mobile switching center, said positioning request to a base station controller connected to said serving base transceiver station;

determining, by said serving base transceiver station, first positioning data associated with said mobile station; and sending, by said serving base transceiver station, said first positioning data to said positioning center via said mobile switching center and said base station controller.

18. The method of claim 17, wherein said step of determining said first channel type is performed by said base station controller.

19. The method of claim 17, wherein said step of determining said first channel type is performed by said mobile switching center.

20. The method of claim 17, wherein said first positioning data is a Timing Advance value.

21. The method of claim 17, further comprising, after said step of forwarding said positioning request, the steps of:

determining, by a second target base transceiver station in communication with said mobile switching center, second positioning data associated with said mobile station; and sending, by said second target base transceiver station, said second positioning data to said positioning center via said mobile switching center and said base station controller.

22. The method of claim 21, further comprising, before said step of determining second positioning data, the step of:

determining, by said base station controller, said first target base transceiver station and said second target base transceiver station; and comprising, after said step of allocating said channel of said second channel type, the steps of:

determining, by said first target base transceiver station, third positioning data associated with said mobile station during said positioning handover; and sending, by said first target base transceiver station, said third positioning data to said positioning center via said mobile switching center and said base station controller.

23. The method of claim 18, further comprising, after said step of sending said first, second, and third positioning data, the step of:

calculating, by said positioning center, the location of said mobile station, using said first, second, and third positioning data.

24. The method of claim 23, further comprising, after said step of calculating, the step of:

sending the location of said mobile station to a positioning requesting node.

* * * * *